(12) United States Patent
Andersson et al.

(10) Patent No.: US 8,588,222 B2
(45) Date of Patent: *Nov. 19, 2013

(54) METHOD AND APPARATUS FOR CONNECTING A NETWORK DEVICE TO A DAISY CHAIN NETWORK

(75) Inventors: Jan Olof Andersson, Apple Valley, MN (US); Kenneth John Lockhart, Surrey (GB); Trevor Lewis Rossner, Surrey (GB); Jeffery Paul Wiedemann, Apple Valley, MN (US); Logan Brent Grauer, Regina, CA (US); Chris Edwin Kasian, Regina, CA (US); William Andrew Perrin, Surrey (GB); Robert Christopher Kwong, Surrey (GB); Glenn William Nichols, Surrey (GB); Jason John Lemon, Regina, CA (US)

(73) Assignee: Uponor Innovation AB, Fristad (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,645

(22) Filed: Mar. 29, 2012

(65) Prior Publication Data

US 2012/0184131 A1 Jul. 19, 2012

Related U.S. Application Data

(63) Continuation of application No. 11/719,365, filed as application No. PCT/US2004/042931 on Dec. 17, 2004, now abandoned.

(51) Int. Cl.
*H04L 12/50* (2006.01)
(52) U.S. Cl.
USPC .............. 370/359; 370/463; 709/250
(58) Field of Classification Search
CPC ............ H05B 37/0254; H01R 13/641; H01R 13/7175

IPC .................... H01Q 11/04; H04L 29/06
See application file for complete search history.

(56) References Cited

U.S. PATENT DOCUMENTS

| 5,414,708 A | 5/1995 | Webber et al. |
| 5,838,236 A | 11/1998 | Bentley et al. |

(Continued)

FOREIGN PATENT DOCUMENTS

| GB | 2325124 | 11/1998 |
| WO | WO 99/63698 | 12/1999 |
| WO | WO 02/15346 | 2/2002 |

OTHER PUBLICATIONS

International Search Report PCT/US2004/038992 dated Jul. 29, 2005.
International Search Report PCT/US2004/042931 dated Jul. 29, 2005.
International Search Report PCT/US2004/042978 dated Aug. 1, 2005.

(Continued)

*Primary Examiner* — Jung Park
(74) *Attorney, Agent, or Firm* — Frost Brown Todd LLC

(57) ABSTRACT

A network device configured to allow the connection of the network device to a network in a daisy chain configuration using a single cable. The network device is connected to a cable with two conductors by a socket that is adapted to receive a plug connected to the end of the cable. When the plug on the end of a cable is inserted into the socket, a first conductor in the cable is connected to an input port of a network component and a second conductor of the cable is connected to an output port of a network component. A signal from the network is transmitted down a first conductor in a cable to a network device and the signal is then transmitted back from the network device down a second conductor in the same cable.

14 Claims, 10 Drawing Sheets

(56) References Cited

U.S. PATENT DOCUMENTS

| | | |
|---|---|---|
| 5,953,540 A | 9/1999 | Raymond et al. |
| 6,611,537 B1 | 8/2003 | Edens et al. |
| 7,218,713 B1 | 5/2007 | Dupuie |
| 7,317,681 B1 | 1/2008 | Ben-Dvora et al. |
| 7,405,719 B2 | 7/2008 | Kobayashi |
| 7,555,409 B1 | 6/2009 | Bhaskar et al. |
| 2002/0012401 A1 | 1/2002 | Karolys et al. |
| 2002/0172218 A1 | 11/2002 | Harrison |
| 2003/0084112 A1 | 5/2003 | Curray et al. |
| 2003/0179868 A1 | 9/2003 | Binder |
| 2004/0025047 A1 | 2/2004 | Mayne et al. |
| 2004/0122738 A1 | 6/2004 | Lum |
| 2004/0224627 A1 | 11/2004 | Becelaere et al. |
| 2011/0153238 A1 | 6/2011 | Spanier et al. |

OTHER PUBLICATIONS

Written Opinion dated Aug. 18, 2005 for Application No. PCT/US2004/042931.

Written Opinion dated Aug. 23, 2005 for Application No. PCT/US2004/038992.

Written Opinion dated Aug. 23, 2005 for Application No. PCT/US2004/042978.

David R. Frick & Co.: "Networking Topologies" Internet Article, 'Online Feb. 18, 2000, XP002338737 Retrieved from the Internet: <URL: http://www.frick-cpa.com/netess/Net_T_opos.asp>' retrieved on Aug. 1, 2005! The whole document.

Anonymous: Presence Sensing Safely Devices: "Presence Sensing Safety Devices: Safety Mats" Internet Article, Online Dec. 6, 2003, pp. 2-88-2-89, XPO02338425 Retrieved from the Internet: URL: http://web.archive.org/web/20031206125042/http://www.ab.com/catalogs/safety/prodtypepdf/ch2/2-88-_2-89.pdf>pp. 2-88-pp. 2-89.

US 8,588,222 B2

METHOD AND APPARATUS FOR CONNECTING A NETWORK DEVICE TO A DAISY CHAIN NETWORK

This application is a continuation of and claims priority to U.S. patent application Ser. No.11/719,365 filed May 15,2007(abandoned), which is a National Stage entry of PCT/US04/042931 filed Dec. 17, 2004.

This invention is in the field of network connector devices and more specifically systems for connecting networks in a daisy chain configuration.

BACKGROUND

Daisy chaining is the simplest way to connect a network. Devices connected by a daisy chain are connected to one to another in series and a message that is sent on the network has to travel down the chain from one device to another. Compared to other network topologies, daisy chaining is relatively slow, however in applications that do not require large amounts of data transfer and fast transfer rates, daisy chaining is still a common practice and daisy chain networks are still very common in industrial control networks.

One common standard that uses a daisy chain configuration for networking devices is the RS-485 standard. While RS-485 devices may be quite common, there are other protocols that specify or can use a daisy chain network configuration such as Apple's LocalTalk™ and many types of industrial applications.

While networked devices using the RS-485 protocol have always been common in industrial systems, such as larger scale heat and ventilation systems, with the decrease in price of control systems, smaller scale control systems are becoming more common. One area using networked devices that can use a daisy chain topology is home automation and especially home HVAC systems.

In order to setup devices in a daisy chain network, a cable has to be strung to each of the devices in the network. With the exception in some cases of the first and last devices in a daisy chain network, each device in the network requires a cable running to it from a previous device and another cable running from it to the next device. This requires each device connected to a daisy chain network to have a first connection for an input cable, coming from the previous device in the network, to be connected to each network device and a second connection for an output cable, running to the next device in the network.

This configuration is necessary because daisy chaining connections utilize termination resistors on each end of the network to ensure that every transceiver is directly connected to the main current path. Transceivers placed outside the termination resistors daisy chain may not be able to correctly sense the voltage drop and "hear" the transmission. In this way "star" wiring configurations are not allowed for daisy chained networks such as RS-485.

The disadvantage of wiring the network is this fashion is that there must be some overall plan to the creation of the network. The devices must be planned to some degree because a cable running from the previous device must be connected to the device and then a second cable connected to the same device and then a second cable connected in another port of the same network device must be run to the next device. This requires the person setting up the network to know where the previous device is as well as the location of the next device. Knowing the placements of the devices may not be overly complicated when the network is small and centralized in one area, but often these daisy chain networks have long distances between devices and these devices might be in different locations that are not in sight of each other. For example, in a HVAC system for a house, the devices connected to the chain network will typically be a controller near the furnace and a number of thermostats connected to the daisy chain network and spread throughout the house. Each thermostat device connected to the network will likely be situated in a different room or location of the house from other devices and it will not always be easy to determine in which direction to run the cable to and from each device.

Additionally, some of the protocols such as RS-485 networks require a termination resistor at the end of the network. This requires one of the devices to serve as the last device and the network must be planned to end at the device that has the termination resistor in it.

Not only must the daisy chain network be planned to some degree, but it can also be complicated to add new devices to the network. To add a new device, the network must be disconnected from one of the device and the new device incorporated into the chain. Again, the location of the previous device and next device must be known, which might not be that easy to determine if the network is spread throughout a large building and numerous rooms.

The different standards for daisy chain networks also specify the type of cable that is required in order to connect the devices. RS-485, for example, specifies certain minimum standards for cable and requires the cable to be a twisted pair in order to use balanced differential signals to reduce or eliminate the effect of interference in the cables.

There are many cables available that meet the recommendations for the different daisy chain network protocols and there are cables that are specially designed for use with these applications. These cables are quite specialized and although daisy chain networks are common, they are not as common as other more standard types of networks. This often makes the special cabling more costly and harder to find because of its lower production. Also, electricians are often not familiar with these types of specialty cables.

In more recent years a number of more standard cable specifications have arisen that are not specifically made for daisy chain networks. One very common type of standard cable is referred to as Category 5 cabling. These standardized cables often include a number of conductors or wire strands and standardized connections to increase the ability of these standard cables to be used in a number of different applications i.e. category 5 consists of four twisted pairs of copper wire terminated by RJ45 connectors.

Because these standard cables can be used in so many applications and circumstances and some, like Category 5 wire, are in common use, they are manufactured in very large quantities which often makes them cheaper then other specialty cables, easier to find and electricians and other installers are more often more familiar with their use.

SUMMARY OF THE INVENTION

It is an object of the present invention to provide a system and apparatus that overcomes problems in the prior art.

The present invention provides, in a first embodiment, a network device comprising: a network component configured to connect to a network in a daisy chain configuration through an input port and an output port; a cable interface comprising: a socket adapted to receive a plug attached to an end of the cable; an input conductor connector operative to connect the input port to the first conductor of the cable when the plug is inserted into the socket; and an output conductor connector operative to connect the output port to the second conductor of the cable when the plug is interested into the socket.

The present invention provides, in a second embodiment, a daisy chain network comprising: a first network device comprising: a network component configured to connect to the network through an input port and an output port; a cable interface comprising a socket adapted to receive a plug, at least one cable comprising a first conductor and a second conductor and a plug attached to at least one end of the cable and inserted into the socket; wherein the first conductor of the cable is connected to the input port and the second conductor of the cable is connected to the output port through the cable interface; and wherein the first and second conductors are connected in series with a second network device and a third network device.

The present invention provides, in a third embodiment, a method of connecting a network device to a network in a daisy chain configuration using a single cable having at least two conductors, the method comprising: providing a network device configured to operate on a daisy chain network; providing a cable comprising at least two conductors; connecting a first conductor of the cable to an input conductor connector of the network device; connecting a second conductor of the cable to an output conductor connector of the network device; transmitting an input signal through first conductor of the cable and into the network device; and transmitting a corresponding output signal out of the network device and back through the second conductor of the cable.

The system allows the connection of a network device to a network in a daisy chain configuration using a single cable. The network device is connected to a cable with two conductors by a socket that is adapted to receive a plug connected to the end of the cable. When the plug on the end of a cable is inserted into the socket, a first conductor in the cable is connected to an input port of a network component and a second conductor of the cable is connected to an output port of a network component. A signal from the network is transmitted down a first conductor in a cable to a network device and the signal is then transmitted back from the network device down a second conductor in the same cable.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
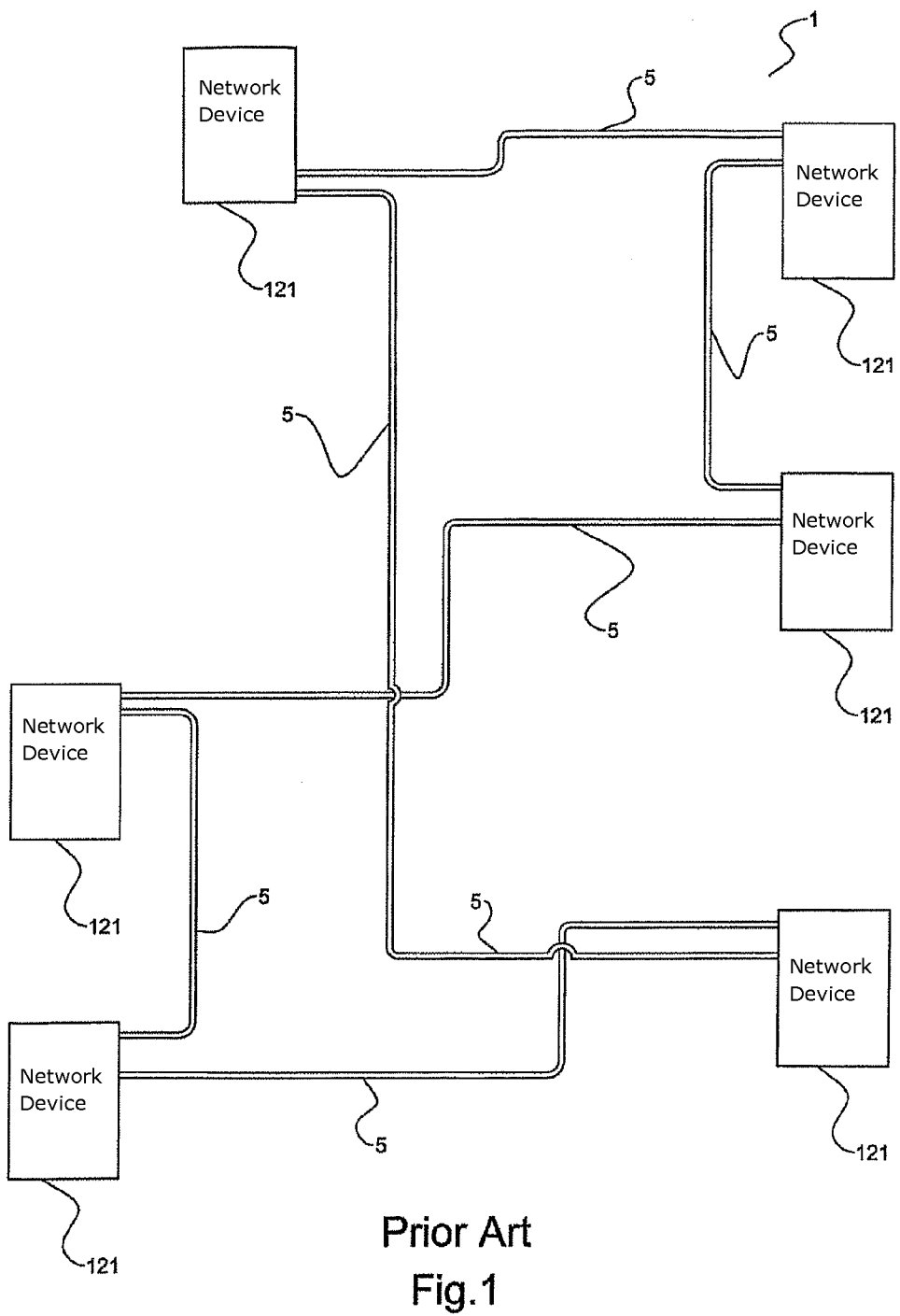
FIG. 1 is a schematic diagram of a network in a daisy chain configuration in accordance with the prior art.

FIG. 1 is a schematic illustration of a network 1 in a daisy chain configuration as known in the prior art. In network 1 a number of network devices 121 are connected by a plurality of network cables 5 that connect the network devices 121 in series. Network devices 121 can be any devices that can operate on a daisy chain configuration such as devices that use the RS485 standard. The network cable 5 has a single conductor and in the case of a daisy chain network operating using the RS485 standard, the single conductor would be a twisted pair of copper wires.

In FIG. 1 each network device 121 is connected to two network cables 5. The network is a daisy chain where each network device 121 is connected to two network cables 5, one network cable 5 connecting the network device 121 to the previous network device 121 using one interface and the other network cable 5 connecting the network device 121 to the next network device 121 through a separate interface.

Figure 2:
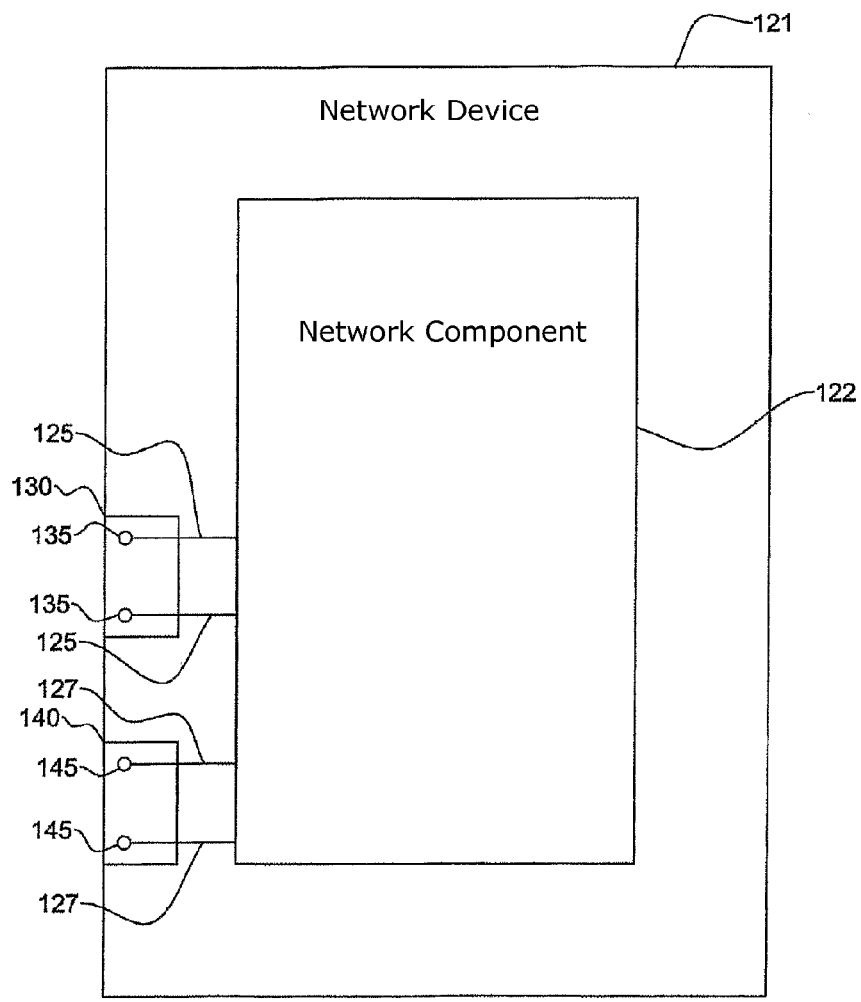
FIG. 2 is a schematic diagram of a network device operative to connect to a network in daisy chain configuration in accordance with the prior art.

FIG. 2 is a schematic illustration of a prior art network device 121 used in network 1, illustrated in FIG. 1. Network device 121 comprises: a network component 122 with an input port 125 and an output port 127; a first input cable interface 130 and a second output cable interface 140. While the terms input and output are conveniently used in describing the invention, it will be understood by someone skilled in the art that if the network is configured to allow bi-directional communication, a port or connection termed an input in this description may transmit out a signal or a port or connection termed an output in this description might receive a signal. Also, typically devices configured to operate on a daisy chain configuration do not require a specific input connection or output connection and the connections can be interchanged without effecting the operation of the network device.

Network device 121 is illustrated in FIG. 2 as being connectable to two cables, each cable having a single conductor, which for the network device 120 illustrated in FIG. 2, the single conductor forms a twisted wire pair. The first input cable interface 130 has a input conductor connector 135 that is operative to connect a conductor of a cable connected to the first input cable interface 130 to the input port 125 of the network component 122 (the conductor connector 135 illustrated in FIG. 2 comprises a pair of conductor connectors for use with a conductor that is formed from a twisted pair). The input conductor connector 135 connects the conductor of a cable to the input port 125 of the network component 122 to receive an input signal and communicate this input signal to the network component 122. The second output cable interface 140 comprises an output conductor connector 145 (because network device 121 is illustrated as connectable to a single conductor comprising a twisted pair, the conductor connector 145 is a pair of conductor connectors operative to connect to a conductor comprising a twisted pair). The output conductor connector 145 connects the conductor of a cable to the output port 127 of the network component 122 to transmit an output signal from the network device 121.

The present invention uses a network cable with at least two conductors to connect a network device to a daisy chain network using a single cable connected to the network device.

Figure 3:
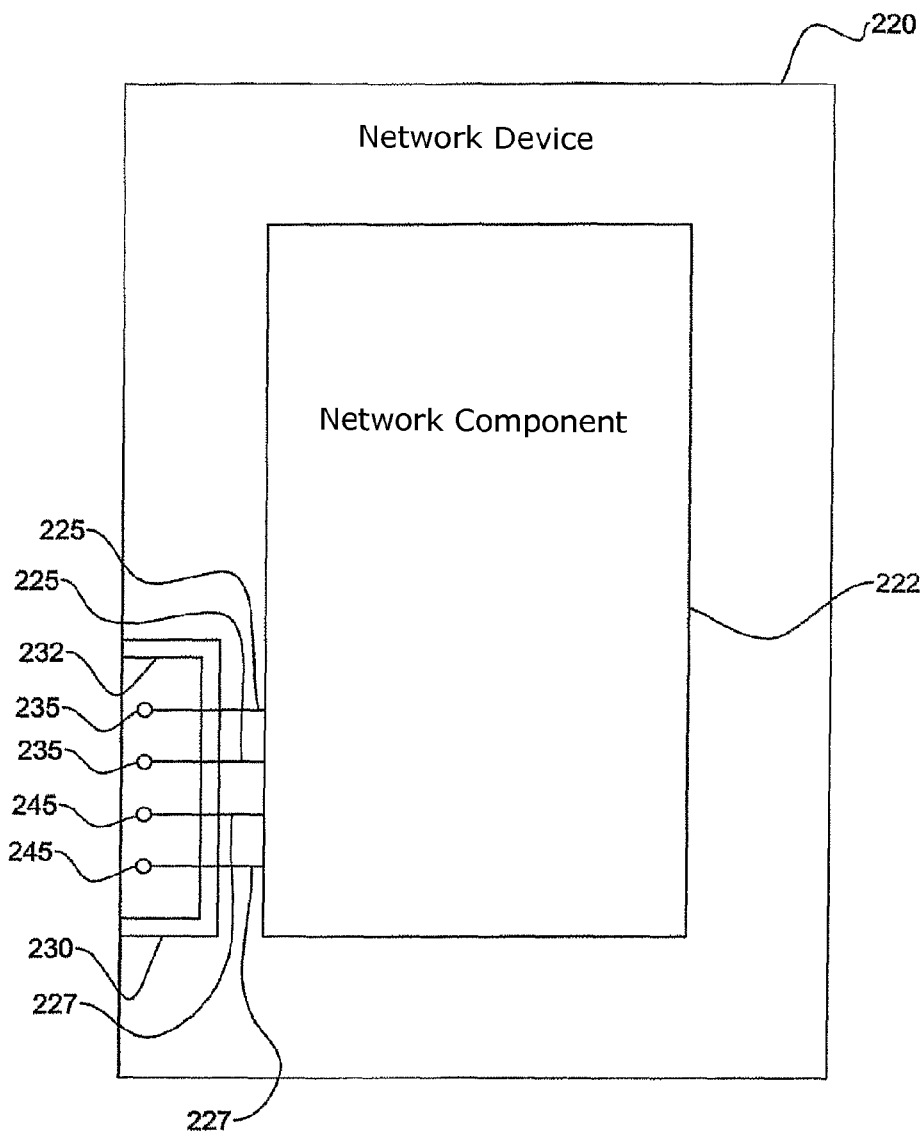
FIG. 3 is a schematic illustration of a daisy chainable network device comprising a single cable interface in accordance with the present invention.

FIG. 3 is a schematic illustration of a daisy chainable network device 220 as contemplated by the present invention. Network device 220 can be any type of network device that is configured to connect to a daisy chain network, such as network devices that operate on the RS48 standard. Network device 220 comprises: a network component 222 with an input port 225 and an output port 227; and a cable interface 230. The cable interface 230 comprises: a socket 232; an input conductor connector 235; and an output conductor connector 245. (the network device 220, illustrated in FIG. 3, is configured to operate on a daisy chain configured network and therefore the input conductor connector 235 and the output conductor connector 245 are illustrated as each having a pair of connection to connect to each wire of a twisted wire pair that is used by the RS-485 standard) The socket 232 is adapted to receive a plug (not shown) that is attached to the end of a cable (not shown) with at least a first conductor and second conductor. When a plug on the end of a cable comprising at least a first conductor and a second conductor is inserted into the socket 232, the input conductor connector 235 is operative to connect the first conductor of the connected cable to the input port 225 of the network component 222 and the output conductor connector 245 is operative to connect the second conductor in the connected cable to the output port 227 of the network component 222.

Figure 4:
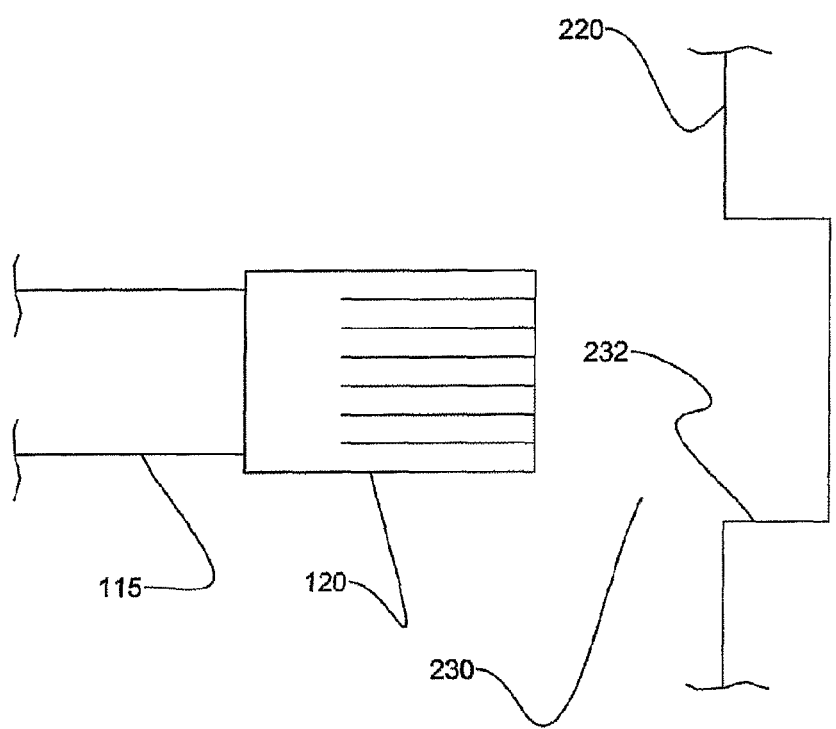
FIG. 4 illustrates a socket of a network device and a plug attached to the end of a cable in accordance with the present invention.

FIG. 4 illustrates a socket of a network device and a plug attached to the end of a cable in accordance with the present invention. Typically, the socket 232 would be adapted to receive a plug 120 that conforms to a commonly available connector standard. For example, the socket 232 could be adapted to receive a plug that is an RJ45 plug, such that a cable that has RJ45 plugs connected on its ends can be inserted into the socket 232.

Figure 5:
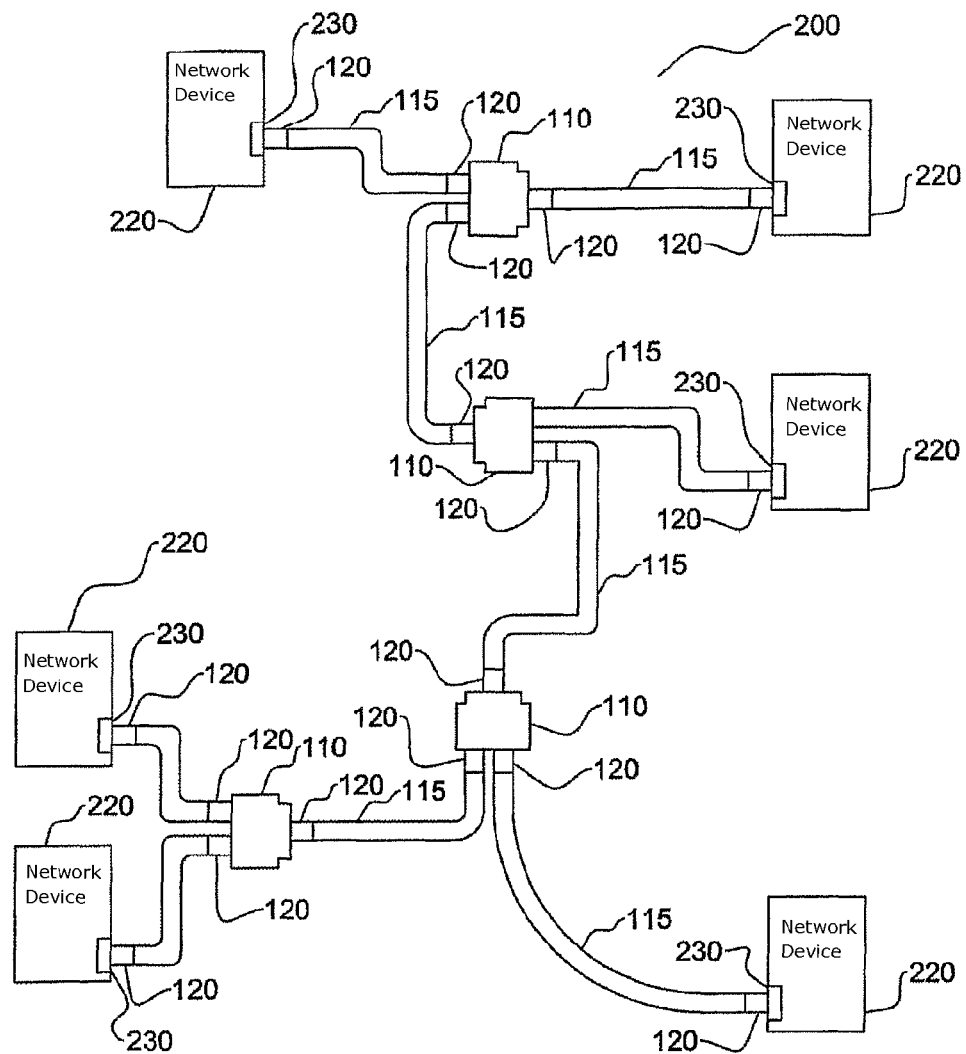
FIG. 5 illustrates one implementation of a daisy chain network using the network devices of FIG. 3.

FIG. 5 illustrates a network 200 in a daisy chain configuration in accordance with the present invention. The network comprises a plurality of cables 115, a plurality of connector devices 110, and a plurality of network devices 220.

The cables 115 comprise a first end and a second end and have at least two conductors. If the cables 115 are for connected network devices 120 that operate in accordance with the RS-485 standard the two conductors will each be a twisted pair of copper wires and if the cable 115 is category 5 cable, the cable will consists of four copper wire pairs.

Figure 6:
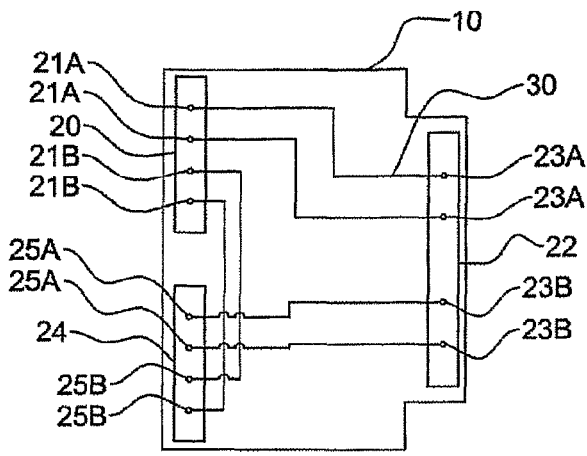
FIG. 6 is a schematic illustration of a connector device used to implement the network of FIG. 5.
Figure 7A:
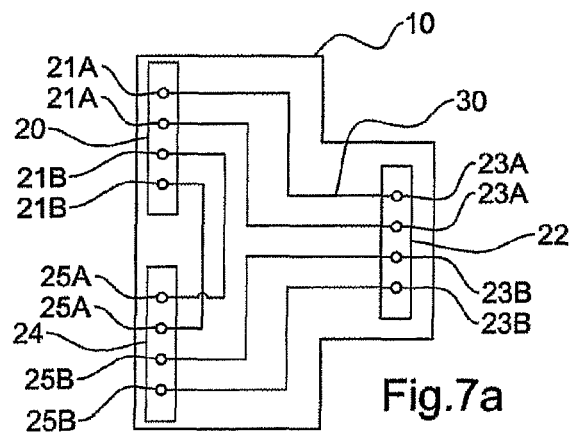
FIGS. 7a through 7g are schematic illustrations of connector devices comprising alternate connection circuits.
Figure 7B:
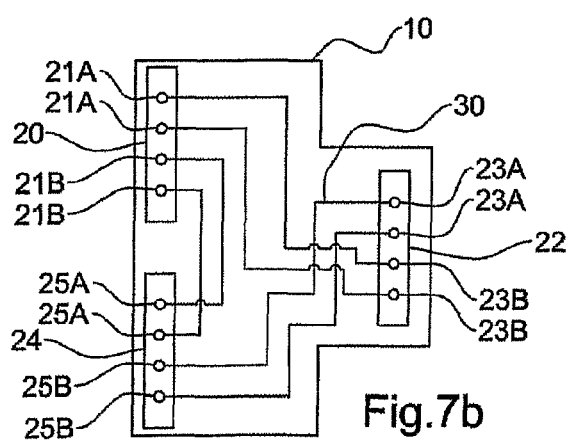
Figure 7C:
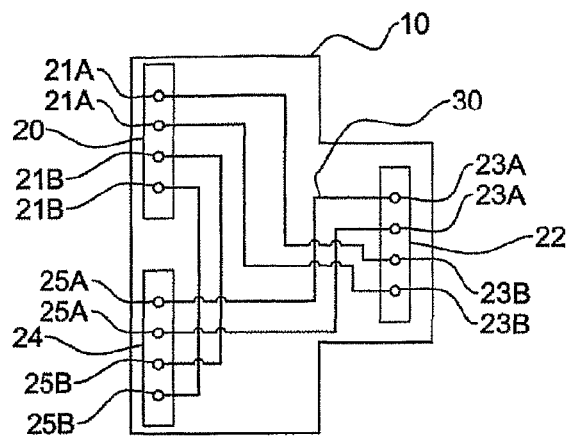
Figure 7D:
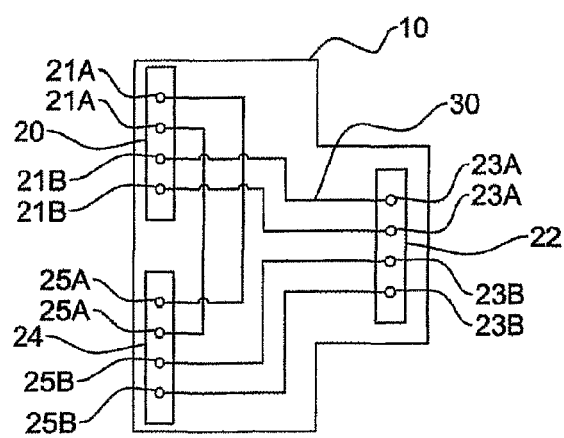
Figure 7E:
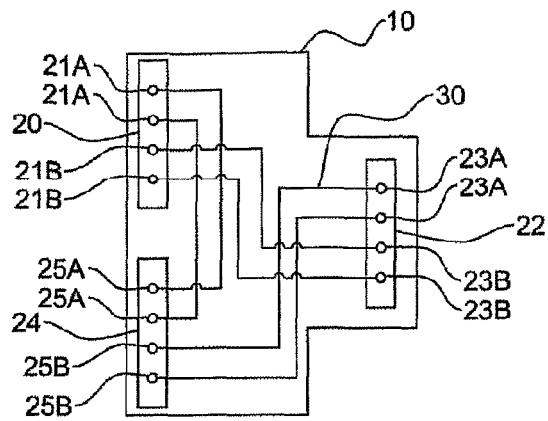
Figure 7F:
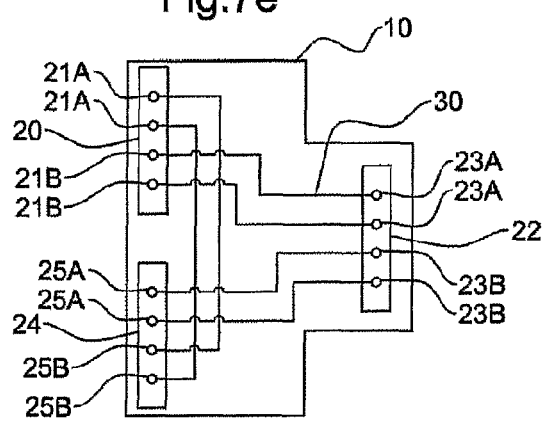
Figure 7G:
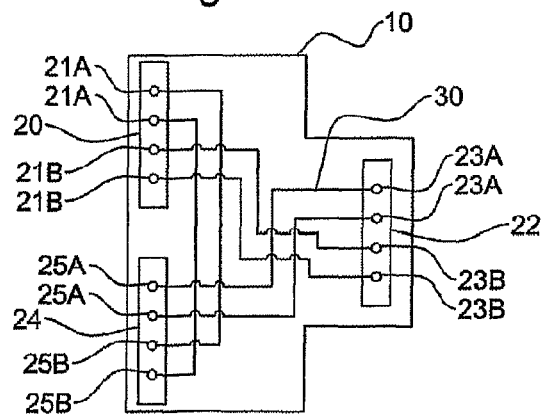

The connector devices 110 can be any connector device that will allow the network 200 to maintain a daisy chain configuration. For example, connector devices 110 could be the connector device as shown in FIG. 6, which is a schematic illustration of a connector device 10. The connector device 10 illustrated allows network devices (not shown) to be connected by cables (not shown) to the connector device 10 in any fashion and the connector device 10 will ensure that the network devices connected to the connector device 10 by cables will be in a daisy chain configuration. The connector device 10 comprises a first cable interface 20, a second cable interface 22, a third cable interface 24, and a connecting circuit 30.

Referring still to FIG. 6, the first cable interface 20, second cable interface 22 and third cable interface 24 are configured to be connectable with a cable comprising at least two conductors. The connector device illustrated in FIG. 4 is configured for a daisy chain network conforming to the RS-485 standard where each conductor is a twisted pair of copper wires and therefore each cable interface is shown as having four connections.

Referring still to FIG. 6, the connecting circuit 30 operably connects the conductors of the cables connected to the cable interfaces in such a manner that the daisy chain configuration of the network is maintained. For the embodiment of the connector device as shown in FIG. 4, the connecting circuit 30 operably connects the first wire pair of a cable connected at conductor connectors 21A of the first cable interface 20 of the connector device 10 to the first wire pair of another cable connected to conductor connectors 23A of the second cable interface 22 of the connector device 10. The second wire pair of a cable connected to conductor connectors 21B of the first cable interface 20 of the connector device 10 will be operably connected by the connecting circuit 30 to the second wire pair of another cable connected to the conductor connectors 25B of the third cable interface 24. Finally, the connecting circuit 30 operably connects the second wire pair of a cable connected to conductor connectors 23B of the second cable interface 22 of the connector device 10 to the first wire pair of a cable connected to a conductor connector 25A of the third cable interface 24.

Alternatively, connector device 110 could be a connector device as illustrated in FIGS. 7a through 7g.

Referring again to FIG. 5, each network device 220 is connected to a cable 115 by a plug 120 on one end of the cable 115 being inserted into the socket (not shown) of the cable interface 230 of each of the network devices 220. The other ends of the cables 115 connected to the network devices 220 are then connected to an interface on a connector 110. The connector devices 110 are connected by a cable 115 to either a network device 120 or another connector device 110. All of the connector devices 110 are connected to at least one other connector device 110 to form a single network.

Because the cables 115 used have two conductors in each cable 115, instead of running two cables to each device, one from the previous device and the other to the next device, the present invention uses a single cable 115 containing two conductors connected to each network device 220 by the cable interface 230 of the network device 220 and the connector device 110 will maintain the network devices 220 in a daisy chain configuration.

In operation, a signal is transmitted through the network to each network device 220. The signal is transmitted through a first conductor of a cable 115 and through the input conductor connector (not shown) of the cable interface an into the network device 220. The signal is then transmitted back out of the network device 220 through a second conductor in the cable 115 and on to the next device in the network 200.

Figure 8:
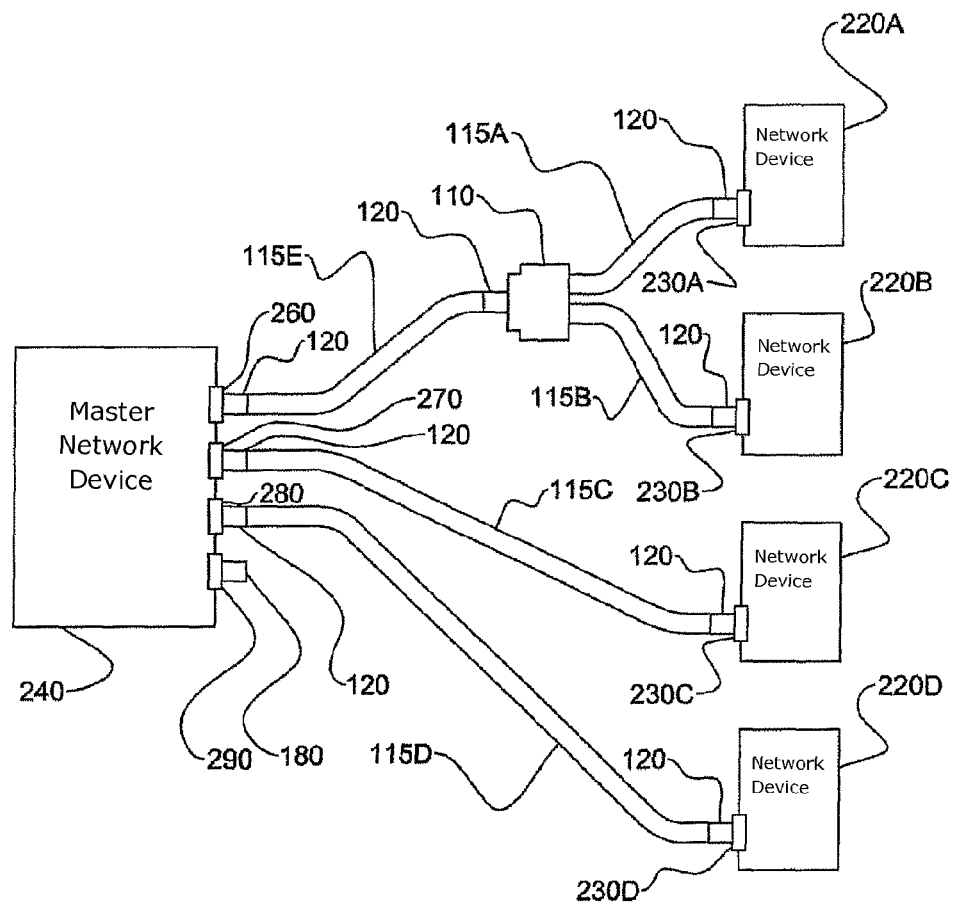
FIG. 8 illustrates a schematic of alternate implementation of a network in a daisy chain configuration using the network devices of FIG. 3.

FIG. 8 illustrates a schematic of another network 300 which is in a daisy chain configuration and uses network devices 220 as contemplated by the present invention. Network 300 comprises: a master network device 240; a plurality of cables 115A, 115B, 115C, 115D and 115E; connector device 110; a connector plug 190; and network devices 220.

Figure 9:
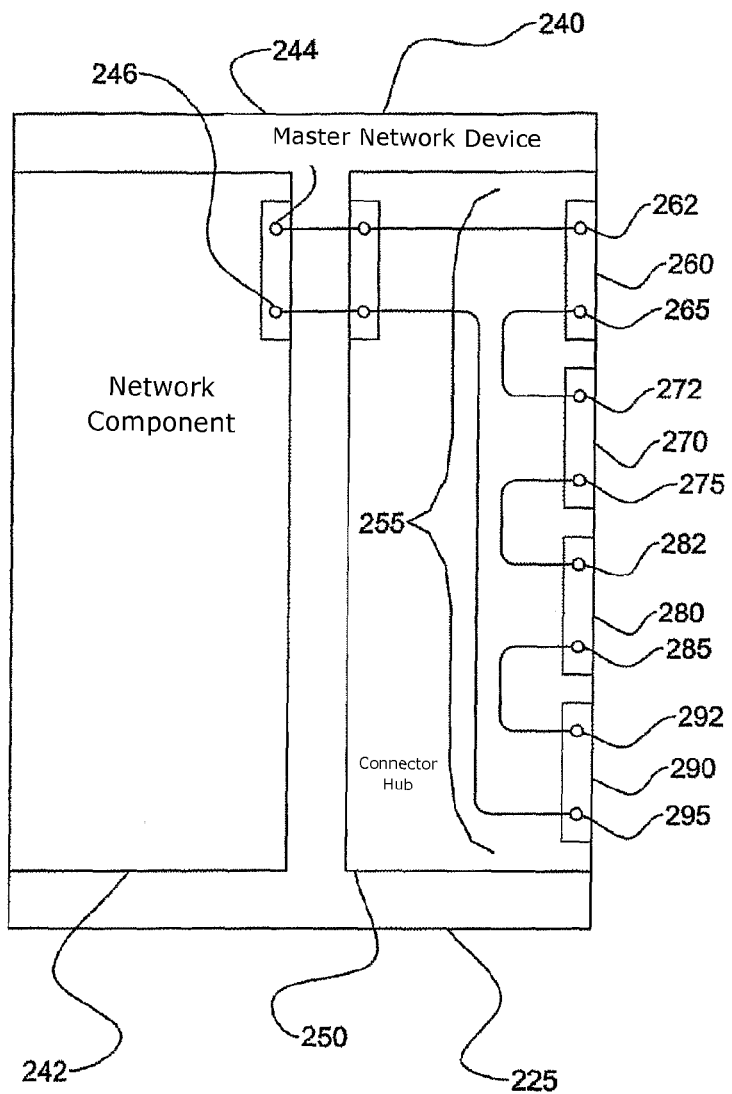

Referring still to FIG. 8, the master network device 240 would maintain the network 300 in a daisy chain configuration and would typically be a master network device as illustrated in FIG. 9. FIG. 9 is a schematic illustration of a master network device 240. The master network device 240 comprises a network component 242 and a connector hub 250. The network component 242 could be any known device that can be connected to a network in a daisy chain configuration, i.e. a controller or other network device and would comprises an output port 244 and an input port 246 for connection to a network configured in a daisy chain. Typically, if the daisy chain network is configured in a master/slave configuration, the network component 242 would be configured as the master device of the network.

Referring still to FIG. 9, the connector hub 250 allows the connection of the network component 242 to a number of different network devices (not shown) in a daisy chain configuration. Connector hub 250 comprises a first cable interface 260, a second cable interface 270, a third cable interface 280, a fourth cable interface 290 and a connection circuit 255.

The first cable interface 260 is operative to connect to a cable comprising at least two conductors and comprises a first conductor connector 262 connectable to a first conductor of a cable connected to the first cable interface 260 and a second conductor connector 265 connectable to another conductor of a cable connected to the first cable interface 260. Both the first conductor connector 262 and the second conductor connector 265 of the first cable interface 260 are connected to the connection circuit 255. The second cable interface 270 is operative to connect to a cable comprising at least two conductors and comprises a first conductor connector 272 connectable to a first conductor of a cable connected to the second cable interface 270 and a second conductor connector 275 connectable to another conductor of a cable connected to the second cable interface 270. Both the first conductor connector 272 and the second conductor connector 275 of the second cable interface 270 are connected to the connection circuit 255. The third cable interface 280 is operative to connect to a cable comprising at least two conductors and comprises a first conductor connector 282 that is connectable to a first conductor of a cable connected to the third cable interface 280 and a second conductor connector 285 that is connectable to another conductor of a cable connected to the third cable interface 280. Both the first conductor connector 282 and the second conductor connector 285 of the third cable interface 280 are connected to the connection circuit 255. The fourth cable interface 290 is operative to connect to a cable comprising at least two conductors and comprises a first conductor connector 292 that is connectable to a first conductor of a cable connected to the fourth cable interface 290 and a second conductor connector 295 that is connectable to another conductor of a cable connected to the fourth cable interface 290. Both the first conductor connector 292 and the second conductor connector 295 of the fourth cable interface 290 are connected to the connection circuit 255.

The connection circuit 255 operatively connects the output port 244 of the network component 242, the input port 246 of the network component 242, the first cable interface 260, the second cable interface 270, the third cable interface 280 and the fourth cable interface 290 in a daisy chain configuration. The output port 244 of the network component 242 is operatively connected by the connection circuit 255 to the first conductor connector 262 of the first cable interface 260. The second conductor connector 265 of the first cable interface 260 is operatively connected by the connection circuit 255 to the first conductor connector 272 of the second cable interface 270. The second conductor connector 275 of the second cable interface 270 is operatively connected by the connection circuit 255 to the first conductor connector 282 of the third cable interface 280. The second conductor connector 285 of the third cable interface 280 is operatively connected by the connection circuit 255 to the first conductor connector 292 of the fourth interface 290. The second conductor connector 295 of the fourth cable interface 290 is operatively connected by the connection circuit 255 to the input port 246 of the network component 242.

The cable interfaces 260, 270, 280 and 290 would comprise a socket that is adapted to receive a plug that is attached to the end of the cable that is connectable to the cable interfaces 260, 270, 280 or 280. For example, it is contemplated that the socket could be adapted to receive a plug conforming to the RJ45 standard that is attached to the end of a cable conforming to the category 5 standard for cable. When the plug is inserted into the socket and the connection is made, the conductor connectors will be connected with the proper conductors in the cable.

Referring again to FIG. 8, the network devices 220A, 220B, 220C and 220D are network devices that require or allow connection to a daisy chain network, such as devices that can operate using the RS-485 standard. These devices could be any type of device that is useful to network in a daisy chain configuration, i.e. a number of input devices or control devices. If the network 300 is configured based on a master/slave relationship between the devices, the master network device 240 will be the controlling or master device and the network devices 320A, 320B, 320C and 320D would be slave devices.

The cables 115A, 115B, 115C, 115D and 115E comprise a first end and a second end and have at least two conductors. If the cables 115A, 115B, 115C, 115D and 115E are for connected network devices 120 that operate in accordance with the RS-485 standard, the two conductors will each be a twisted pair of copper wires and if the cable 115A, 115B, 115C, 115D and 115E is category 5 cable, the cable will consists of four copper wire pairs. The cables 115A, 115B, 115C, 115D and 115E have plugs 120 attached to the ends. Plugs 120 are operative to be received by the sockets (not shown) in cable interfaces 230A, 230B, 230C and 230D. Typically the plugs 120 would be RJ45 ends to allow quick snap connections to the devices in the network 300, numerous other types of plugs could also be used.

The connector device 110 could be any connector device that is operative to maintain the devices connected to it in a daisy chain configuration, but would typically be a connector device as illustrated in one of FIGS. 6, 7a through 7g.

Referring again to FIG. 8, the shorting plug 180 connects a pair of conductor connectors in an interface together when a cable is not connected to the interface. Using the shorting plug 180 will maintain the balance of the signal in the network, but it is not strictly required.

Each of the network devices 220A, 220B, 220C and 220D are connected by a cable interface 230A, 230B, 230C and 230D to one end of a cable 115A, 115B, 115C and 115D, respectively, by having the socket (not shown) of the cable interface 230A, 230B, 230C or 230D receive the plug 120 attached to the end of the cable 115A, 115, 115C and 115D, respectively. The plug 120 attached to the other end of each cable 115A, 115B, 115C and 115D is then connected to either a cable interface 270 or 280 on the master network device 240 or the connector 110. Network device 220A will be connected by a cable 115A to the connector 110. Another network device 320B will also be connected by another cable 115B to another interface on the connector 110. The connector 110 is connected by cable 115E to cable interface 260 of the master network device 240. Network device 220C and network device 220D are each connected by a cable 115C and cable 115D directly to cable interfaces 270 and 280 of the master network device 240, respectively. Cable interface 290 has a shorting plug 180 inserted in it.

In operation network 300 operates as follows. Master network device 240 transmits a signal. The signal is transmitted out cable interface 260 of the master network device 240 and through a first conductor in the cable 115E. The signal is transmitted into connected device 110 and from connector device 110 through a first conductor in cable 115A and into network device 220A (if connector device 110 is the connector device illustrated in FIG. 5). The signal is then transmitted out of network device 220A through a second conductor in the cable 115A and back into connector device 110. From connector device 110 the signal is transmitted through a first conductor in cable 115B to the network device 220B. The signal then passes back out of network device 220B through a second conductor in cable 115B back and into connector device 110 where the signal is then transmitted back through a second conductor in cable 115E and back into the master network device 240 through cable interface 260. The signal is then transmitted out of cable interface 270 through a first conductor in the cable 115C and into network device 220C. From network device 220C the signal passes back though a second conductor in cable 115C and back through cable interface 270 into the master network device 240. From the master network device 240, the signal is transmitted out of cable interface 280 through a first conductor of cable 115D to network device 220D. From network device 220D, the signal is transmitted back through a second conductor of cable 115D and back into the master network device 240 through cable interface 280. The signal then passes through shorting plug 180 in cable interface 290.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A network device comprising:
   a network component configured to connect to a network in a daisy chain configuration through an input port and an output port;
   a single cable interface comprising:
      a socket adapted to receive a plug attached to an end of a single cable having a first conductor and a second conductor;
      an input conductor connector provided in the socket and operative to connect the input port to the first conductor of the single cable when the plug is inserted into the socket; and
      an output conductor connector provided in the socket and operative to connect the output port to the second conductor of the single cable when the plug is interested into the socket,
   wherein incoming signals from a previous network device are transmitted through the first conductor of the cable to the input conductor connector in the single socket and outgoing signals are transmitted from the output conductor connector through the second conductor of the cable to a next network device.

2. The device of claim 1 wherein each of the input conductor connector and the output conductor connector are operative to connect to a conductor that is a twisted wire pair.

3. The device of claim 1 wherein the cable interface is operative to connect to a category 5 cable.

4. The device of claim 1 wherein the plug and socket conform to the RJ45 standard.

5. The device of claim 1 wherein the device is configured to operate on the RS-485 standard.

6. A daisy chain network comprising:
   a first network device comprising:
      a network component configured to connect to the network through an input port and an output port; and
      a single cable interface comprising a socket adapted to receive a plug,
   a cable comprising a first conductor and a second conductor and a plug attached to one end of the cable, the plug connected to the socket of the first network device;
   a previous network device operatively connected to the first network device to transmit signals to the first network device though the first conductor of the cable connected to the socket of the first network device; and
   a next network device operatively connected to the first network device to receive signals from the first network device through the second conductor of the cable connected to the socket of the first network device,
   wherein the first conductor of the cable is connected to the input port and the second conductor of the cable is connected to the output port through the cable interface.

7. The network of claim 6 wherein the first conductor and the second conductor each comprises a twisted wire pair.

8. The network of claim 6 wherein the cable is a category 5 cable.

9. The network of claim 6 wherein the plug and the socket conform to the RJ45 standard.

10. The network of claim 6 wherein the device is configured to operate on the RS-485 standard.

11. A method of connecting a network device to a network in a daisy chain configuration using a single cable having at least two conductors, the method comprising:
    providing a network device configured to operate on a daisy chain network;
    providing a single cable comprising at least two conductors;
    connecting a first conductor of the single cable to an input conductor connector of the network device;
    connecting a second conductor of the single cable to an output conductor connector of the network device;
    transmitting an input signal through first conductor of the single cable and into the network device; and
    transmitting a corresponding output signal out of the network device and back through the second conductor of the single cable.

12. The method of claim 11 wherein the cable is a category 5 cable.

13. The method of claim 11 wherein the first conductor and second conductor each comprises a twisted wire pair.

14. The method of claim 11 wherein the network device operates on the RS-485 standard.

* * * * *